(12) United States Patent
Tseng et al.

(10) Patent No.: US 11,794,367 B2
(45) Date of Patent: Oct. 24, 2023

(54) COLD KNIFE HOLDER CAPABLE OF PUSHING AND PULLING OPERATION

(71) Applicants: Yu-Yang Tseng, Taichung (TW); Heng-Yi Hsu, Tainan (TW)

(72) Inventors: Yu-Yang Tseng, Taichung (TW); Heng-Yi Hsu, Tainan (TW)

( * ) Notice: Subject to any disclaimer, the term of this patent is extended or adjusted under 35 U.S.C. 154(b) by 192 days.

(21) Appl. No.: 17/209,764

(22) Filed: Mar. 23, 2021

(65) Prior Publication Data

US 2022/0305682 A1 Sep. 29, 2022

(51) Int. Cl.
*B26B 27/00* (2006.01)
*B26B 5/00* (2006.01)
*B26B 3/00* (2006.01)
*B26B 1/08* (2006.01)
*B26B 1/10* (2006.01)
*B25B 27/00* (2006.01)

(52) U.S. Cl.
CPC ............... *B26B 27/00* (2013.01); *B26B 1/08* (2013.01); *B26B 1/10* (2013.01); *B26B 3/00* (2013.01); *B26B 5/00* (2013.01); *B25B 27/0035* (2013.01)

(58) Field of Classification Search
CPC .... B26B 1/08; B26B 1/10; B26B 3/00; B26B 5/00; B26B 27/00; B25G 1/00; B25G 1/06; B25G 3/02; B25G 3/04; B26D 1/00; B25B 27/0035
See application file for complete search history.

(56) References Cited

U.S. PATENT DOCUMENTS

| 3,448,517 | A | * | 6/1969 | Cothery | B25B 27/0092 30/317 |
| 3,750,283 | A | * | 8/1973 | Hoffman | B23D 49/167 83/750 |
| 3,994,194 | A | * | 11/1976 | Moceri | B26F 1/3846 83/450 |
| 4,037,668 | A | * | 7/1977 | Svejda | B25G 1/06 172/611 |
| 4,215,475 | A | * | 8/1980 | Morford | B26B 7/00 30/220 |
| 4,539,467 | A | * | 9/1985 | Wenger | B26D 7/10 30/140 |
| 4,819,531 | A | * | 4/1989 | Lawhon | B62D 65/06 30/314 |
| 5,398,946 | A | * | 3/1995 | Quiring | B25B 23/0035 279/75 |

(Continued)

*Primary Examiner* — Jason Daniel Prone
(74) *Attorney, Agent, or Firm* — Egbert, McDaniel & Swartz, PLLC (57) ABSTRACT

A cold knife holder capable of pushing and pulling operations, includes a main body forming a chamber and a slot, a handle, a detent member, a first spring and a first steel ball. One side of the main body forms a perforation which communicates with the chamber. The handle includes a sleeve, a connecting rod and a grip rod. Both ends of the connecting rod are respectively connected to the sleeve and the grip rod, and the sleeve is pivotally sleeved on the main body, so that the handle is rotated relative to the main body, and the first or second caulking is connected to the perforation, and the detent member is arranged in the chamber. The first steel ball is pivotally embedded in the perforation, so that the detent member drives the first steel ball to be embedded in the first or second caulking, thereby positioning the handle.

10 Claims, 9 Drawing Sheets

(56) References Cited

U.S. PATENT DOCUMENTS

| | | | | |
|---|---|---|---|---|
| 5,400,510 | A * | 3/1995 | Glodowski | B26B 29/06 30/298 |
| 5,400,512 | A * | 3/1995 | Brush | B26B 1/00 30/321 |
| 5,622,093 | A * | 4/1997 | Hutchins | B26B 27/002 30/372 |
| 5,784,788 | A * | 7/1998 | Cothery | B26B 5/00 30/294 |
| 5,826,342 | A * | 10/1998 | Zuro | B26B 3/00 30/294 |
| 6,256,889 | B1 * | 7/2001 | Zuro | B26B 5/00 30/314 |
| 6,321,455 | B1 * | 11/2001 | Burchell | B26B 5/00 30/321 |
| 6,393,703 | B1 * | 5/2002 | Wu | B25G 1/06 30/232 |
| 6,591,502 | B1 * | 7/2003 | Gmeilbauer | B26B 27/002 30/272.1 |
| 6,772,468 | B1 * | 8/2004 | Psik | B25G 1/06 15/147.1 |
| 7,308,763 | B2 * | 12/2007 | Glodowski | B26B 5/00 30/314 |
| 7,596,871 | B1 * | 10/2009 | Nilsson | B25G 3/02 30/340 |
| 7,716,841 | B2 * | 5/2010 | Kang | B25F 1/02 30/294 |
| 7,874,074 | B1 * | 1/2011 | Rodriguez-Vega | B26B 5/005 30/298 |
| 8,099,869 | B2 * | 1/2012 | Hess | B26B 27/002 30/296.1 |
| 8,371,031 | B2 * | 2/2013 | Davies | B26B 5/00 30/294 |
| D964,836 | S * | 9/2022 | Tseng | B25D 1/00 D8/98 |
| 2003/0101594 | A1 * | 6/2003 | Diemert | B26B 5/00 30/314 |
| 2006/0144195 | A1 * | 7/2006 | Tanga | B25G 3/06 81/20 |
| 2012/0167322 | A1 * | 7/2012 | Jaworski | B25G 1/06 15/144.1 |

* cited by examiner

COLD KNIFE HOLDER CAPABLE OF PUSHING AND PULLING OPERATION

CROSS-REFERENCE TO RELATED U.S. APPLICATIONS

Not applicable.

BACKGROUND OF THE INVENTION

1. Field of the Invention

The present invention relates generally to a tool for dismounting an automobile windshield, and more particularly to an innovative structure type of a cold knife holder capable of pushing and pulling operations.

2. Description of Related Art Including Information Disclosed Under 37 CFR 1.97 and 37 CFR 1.98

The windshield is installed on the vehicle's supporting frame. One side of the windshield facing the vehicle's interior is installed on the supporting frame with an annular sealing element formed of adhesive. One side of the windshield facing the vehicle's exterior is surrounded with a waterproof rubber strip. To change the windshield, when the waterproof rubber strip is removed, the sealing element is destroyed by a cutter, so that the windshield can be removed from the vehicle.

The known cutter for destroying the sealing element includes a cold knife holder, a blade, a connecting strand and a handle. A slot is opened in one end of the cold knife holder, the blade includes an inserting part and a cutting part, the inserting part is inserted in the slot, and the cutting part is bent by 90° against the inserting part. The cutting part is used for piercing the sealing element. One end of the connecting strand is connected to one side of the cold knife holder, the other end of the connecting strand is connected to the handle.

The cold knife holder is operated to make the cutting part pierce into the sealing element, and then the cold knife holder is held in one hand, the cutting part remains between the windshield and the supporting frame, the handle is gripped and pulled by the other hand, the handle pulls the cold knife holder through the connecting strand, the cutting part shifts along the sealing element, and destroys the sealing element, so that the windshield can be removed from the supporting frame.

Generally, the vehicle's width is much larger than the operator's arm length. When destroying the sealing element, the cutting part cannot be moved from one side near the vehicle to the other side near the vehicle through one operation. At this point, the operator is on one side of vehicle, the cutting part pierces into the sealing element in the central portion of vehicle width, and the cold knife holder is pulled, so that the cutting part moves to the operator's side. Afterwards, the cutting part is extracted from the sealing element, the operator moves to the opposite side of vehicle, the cutting part pierces into the sealing element in the central portion of vehicle width again, and the cutting part is moved to the operator's side, the operating procedure is complicated.

BRIEF SUMMARY OF THE INVENTION

The fundamental purpose of the present invention is to provide a cold knife holder capable of pushing and pulling operations, which can enhance the usability.

Based on the aforementioned purpose, the technical characteristic of problem solving of the present invention is that the cold knife holder capable of pushing and pulling operations includes:

a cold knife holder capable of pushing and pulling operation, including:

a columnar main body, said main body has a first end and a second end, said first end and said second end are opposite to each other in the axial direction of the main body, said main body forms a chamber and a slot, said chamber extends from the first end into said main body, said slot extends from the second end into said main body, so that a blade is inserted in said slot, an abutting surface is formed inside said main body, said chamber is located between said first end and said abutting surface, one side of said main body forms a perforation, said perforation communicates with said chamber;

a handle, said handle includes a sleeve, an elongated connecting rod, and a grip rod, wherein one end of said connecting rod is connected to one side of said sleeve, the other end of said connecting rod is connected to said grip rod, so that said grip rod can be gripped by the user, said sleeve is pivotally sleeved on said main body, said sleeve has a pipe wall, one side of said pipe wall facing said main body forms a first hole and a second hole, said first hole and said second hole are opposite to each other in the radial direction of said sleeve, so that said handle rotates against said main body, and said first hole or said second hole communicates with said perforation;

a detent member movably arranged in said chamber, so that said detent member reciprocates between a first position and a second position in the axial direction of said main body;

a first spring arranged in said chamber, both ends of said first spring prop said abutting surface and said detent member respectively, and a first steel ball pivotally embedded in said perforation, said first steel ball laterally props said detent member, so that said detent member drives said first steel ball to be embedded in said first hole or said second hole, and said handle is positioned.

The main effect and advantage of the present invention are that the main body can be pushed or pulled, so that the usability is enhanced when the blade is installed on the main body to destroy the sealing element.

DETAILED DESCRIPTION OF THE INVENTION

As shown in FIG. 1 to FIG. 9, the preferred embodiment of the aforementioned cold knife holder capable of pushing and pulling operations includes a columnar main body 10, a handle 20, a detent member 30, a first spring 42 and a first steel ball 52. Wherein the main body 10 has a first end 11 and a second end 12. The first end 11 and the second end 12 are opposite to each other in the axial direction of the main body 10. The main body 10 forms a chamber 13, the chamber 13 extends from the first end 11 into the main body 10. An abutting surface 14 is formed inside the main body 10. The chamber 13 is located between the first end 11 and the abutting surface 14. One side of the main body 10 forms a perforation 15, the perforation 15 communicates with the chamber 13. The main body 10 forms a slot 16, the slot 16 extends from the second end 12 into the main body 10, so that a blade 82 is inserted in the slot 16.

The handle 20 includes a sleeve 21, an elongated connecting rod 22 and a grip rod 23. Wherein one end of the connecting rod 22 is connected to one side of the sleeve 21, the other end of the connecting rod 22 is connected to the grip rod 23, so that the grip rod 23 can be gripped by the user. The sleeve 21 is pivotally sleeved on the main body 10. The sleeve 21 has a pipe wall 212, one side of the pipe wall 212 facing the main body 10 forms a first hole 214 and a second hole 216, the first hole 214 and the second hole 216 are opposite to each other in the radial direction of the sleeve 21. The first hole 214 and the second hole 216 penetrate the pipe wall 212 respectively, hereby the handle 20 can rotate against the main body 10 taking the axial direction of the main body 10 as center, and the first hole 214 or the second hole 216 communicates with the perforation 15. The first hole 214 and the second hole 216 may not penetrate the pipe wall 212, so as to form a different implementation option.

The detent member 30 is movably arranged in the chamber 13, so that the detent member 30 reciprocates between a first position 84 and a second position 86 in the axial direction of the main body 10. The first spring 42 is arranged in the chamber 13, both ends of the first spring 42 prop the abutting surface 14 and the detent member 30 respectively. The first steel ball 52 is pivotally embedded in the perforation 15, the first steel ball 52 laterally props the detent member 30, so that the detent member 30 drives the first steel ball 52 to be embedded in the first hole 214 or the second hole 216, and then the handle 20 is positioned.

As the first Lau mg hole 214 and the second hole 216 penetrate the pipe wall 212 respectively, the inside diameter of the first hole 214 and the second hole 216 is smaller than the outside diameter of the first steel ball 52, the first steel ball 52 can be partially embedded in the first hole 214 or the second hole 216, and the first steel ball 52 cannot depart from the sleeve 21 through the first hole 214 or the second hole 216.

When the detent member 30 is in the first position 84, the detent member 30 compels the first steel ball 52 to be embedded in the hole 214, the sleeve 21 cannot rotate as confined by the first steel ball 52. When the detent member 30 moves to the second position 86 in axial direction, the handle 20 can be operated to rotate taking the axial direction of the main body 10 as center. At this point, the pipe wall 212 compels the first steel ball 52 to depart from the first hole 214 towards the inside of the chamber 13. As the sleeve 21 rotates, when the second hole 216 is opposite to the perforation 15, the first spring 42 provides a thrust to return the detent member 30 to the first position 84, the detent member 30 drives the first steel ball 52 to be embedded in the second hole 216, the handle 20 is positioned again.

The handle 20 is rotated by actuating the detent member 30 to the second position 86, the grip rod 23 can face any one of two opposite sides of the main body 10. The handle 20 can be fixed by actuating the detent member 30 to the first position 84, so as to position the grip rod 23.

Figure 1:
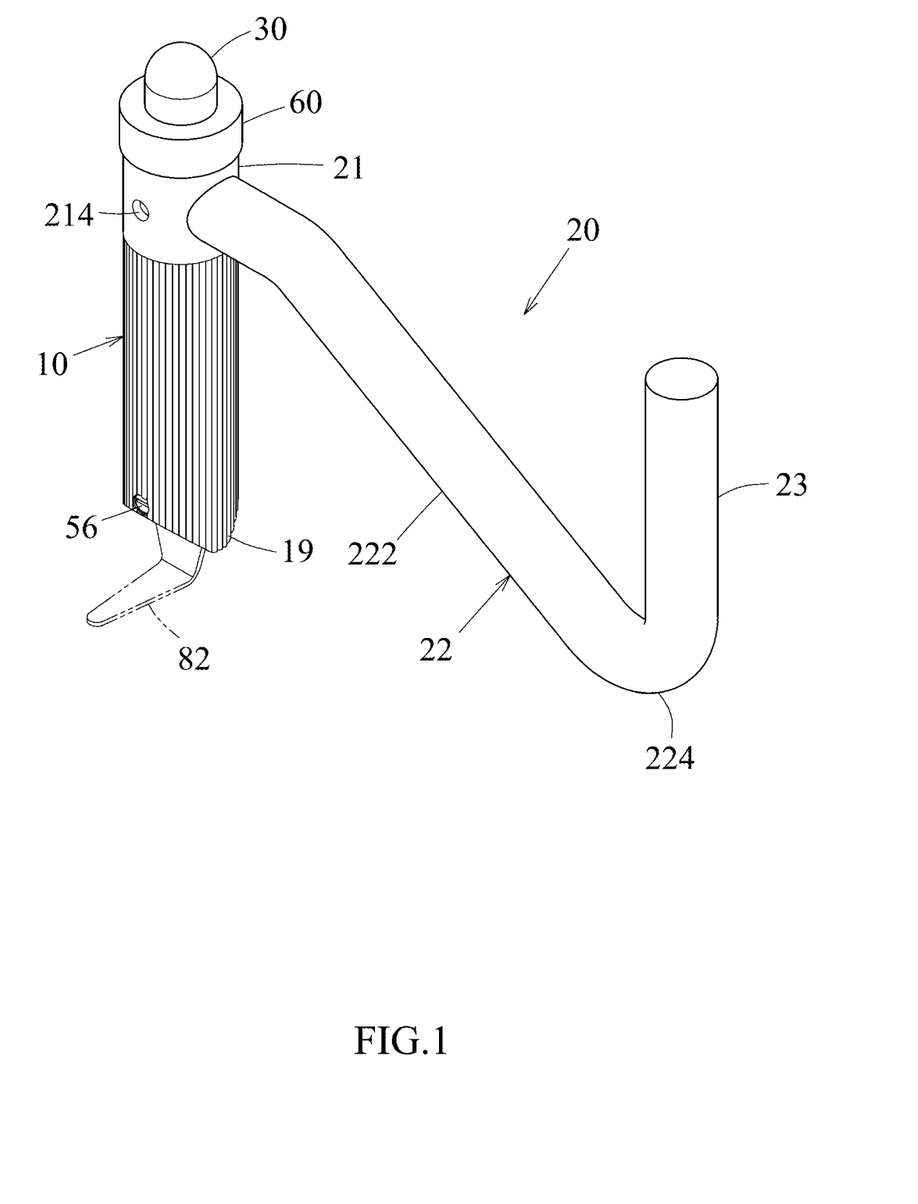
FIG. 1 is a stereogram of the preferred embodiment of the present invention.
Figure 2:
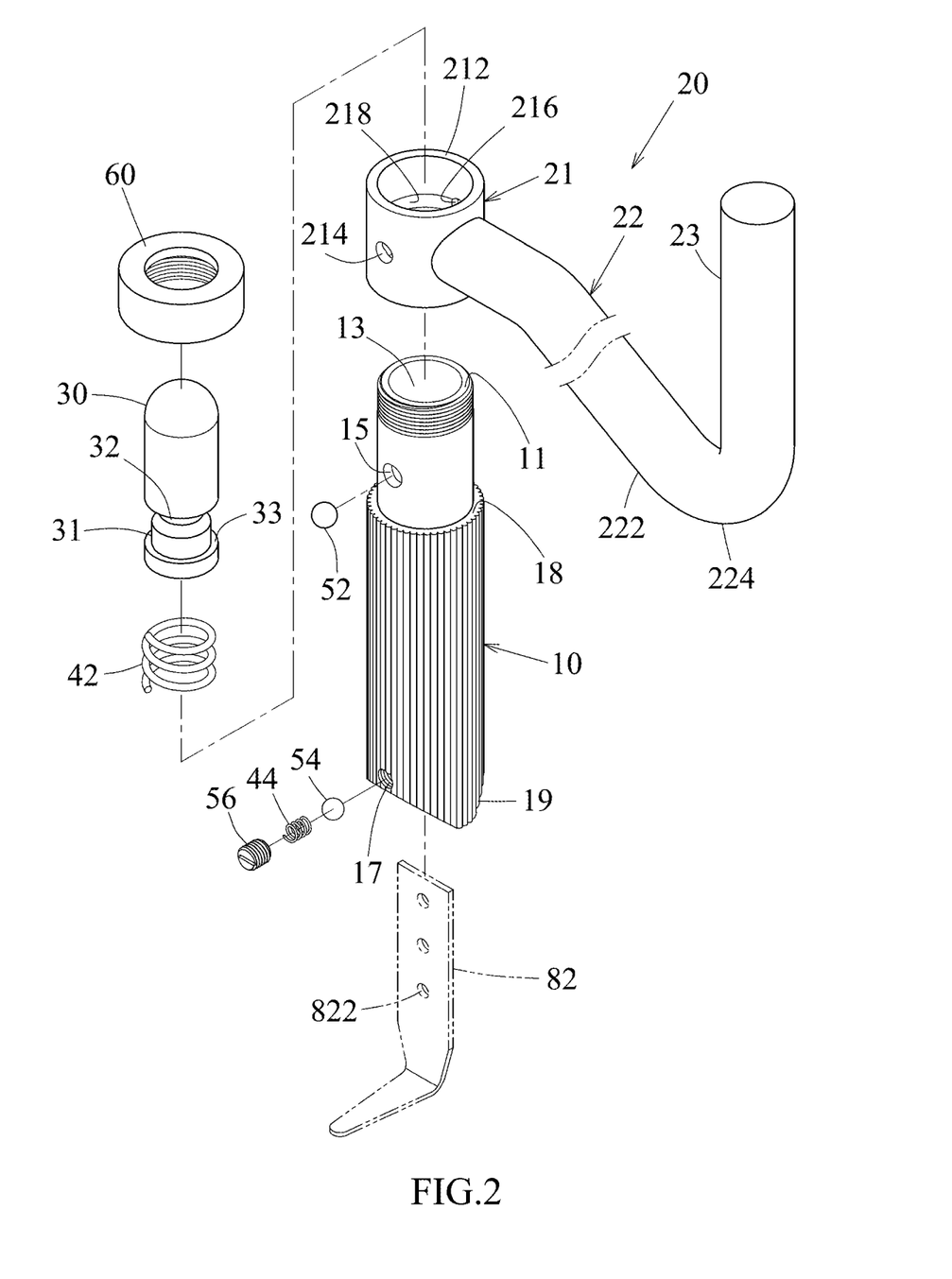
FIG. 2 is a three-dimensional exploded diagram of the preferred embodiment of the present invention.
Figure 3:
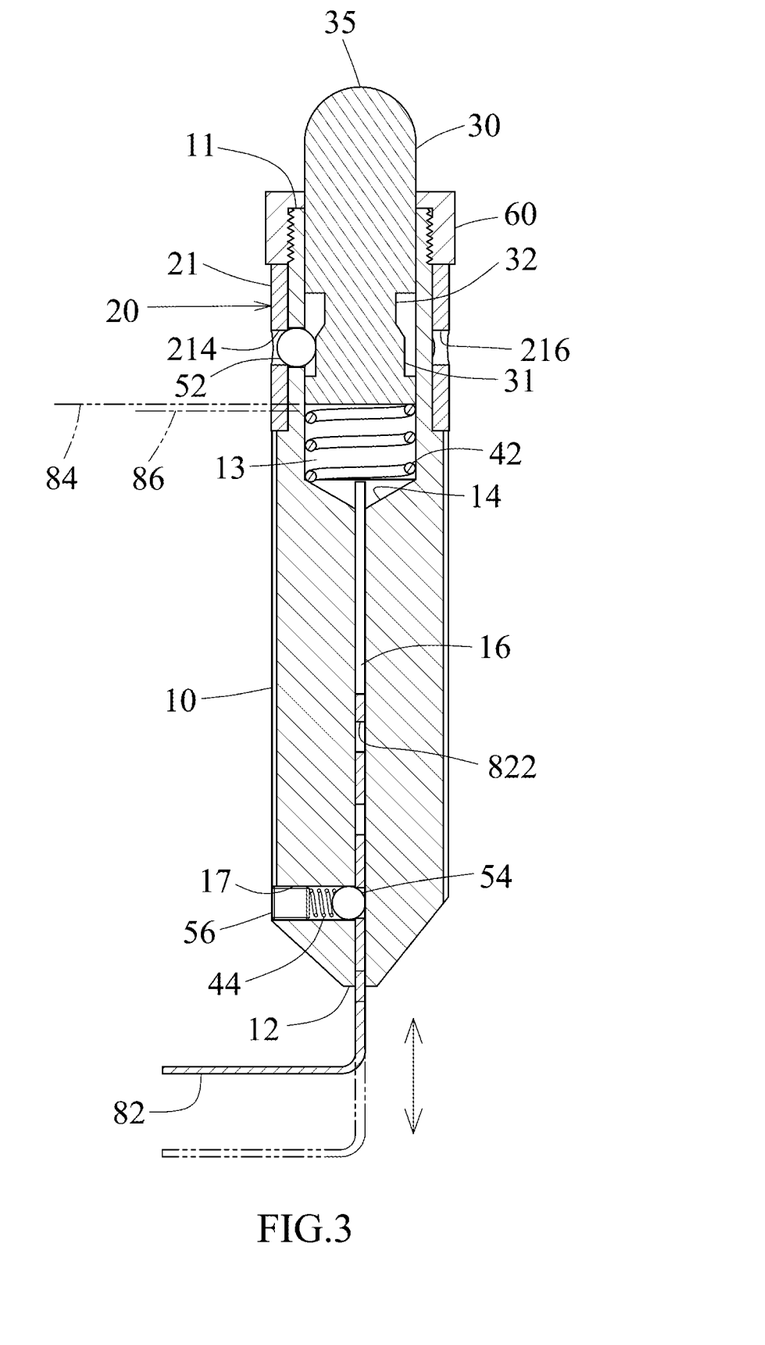
FIG. 3 is a sectional view of the preferred embodiment of the present invention provided with a blade.
Figure 4:
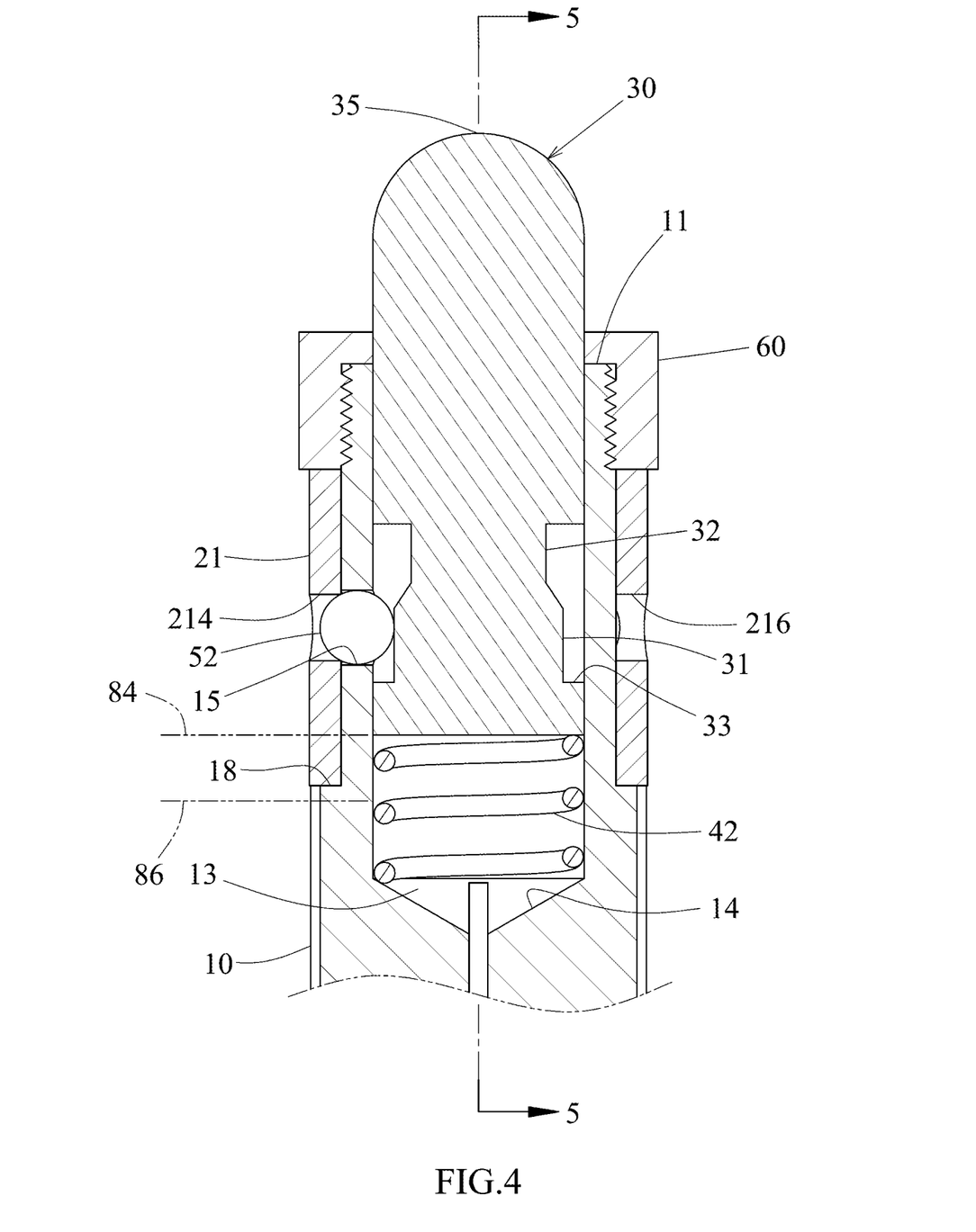
FIG. 4 is a drawing illustrating partial enlargement of FIG. 3.
Figure 5:
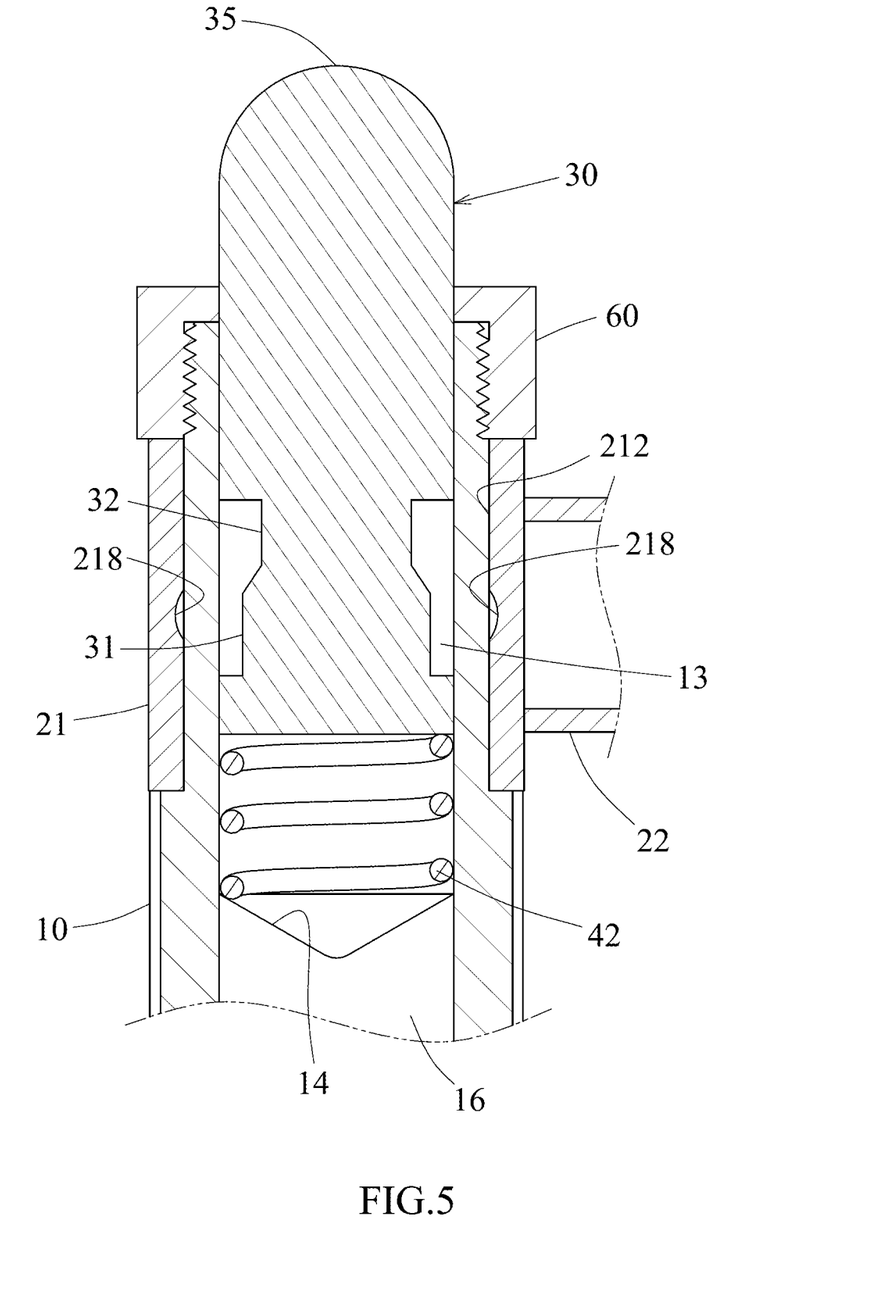
FIG. 5 is the 5-5 sectional view of FIG. 4.
Figure 6:
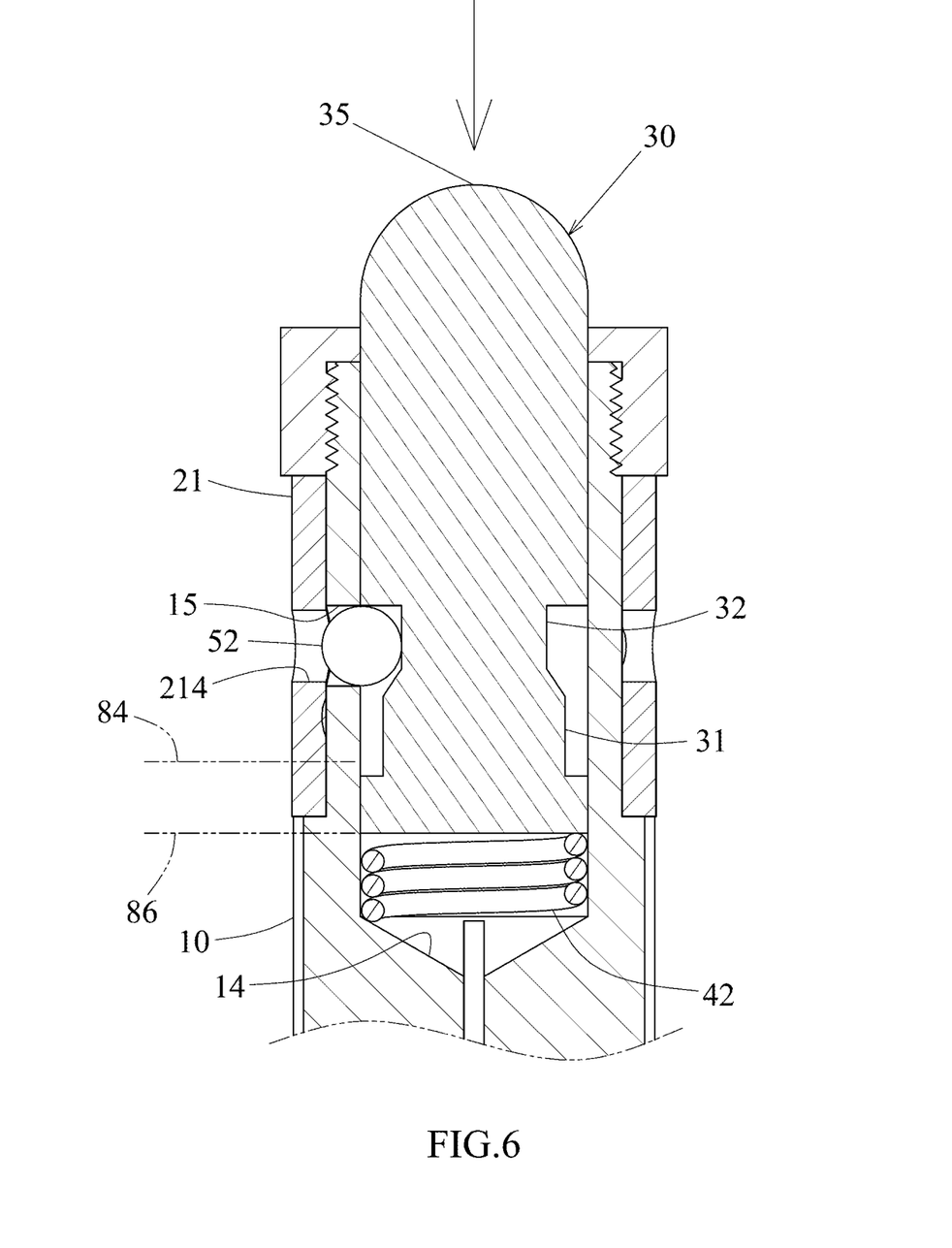
FIG. 6 is a sectional view of partial enlargement of the main body and handle disconnected in the preferred embodiment of the present invention.
Figure 7:
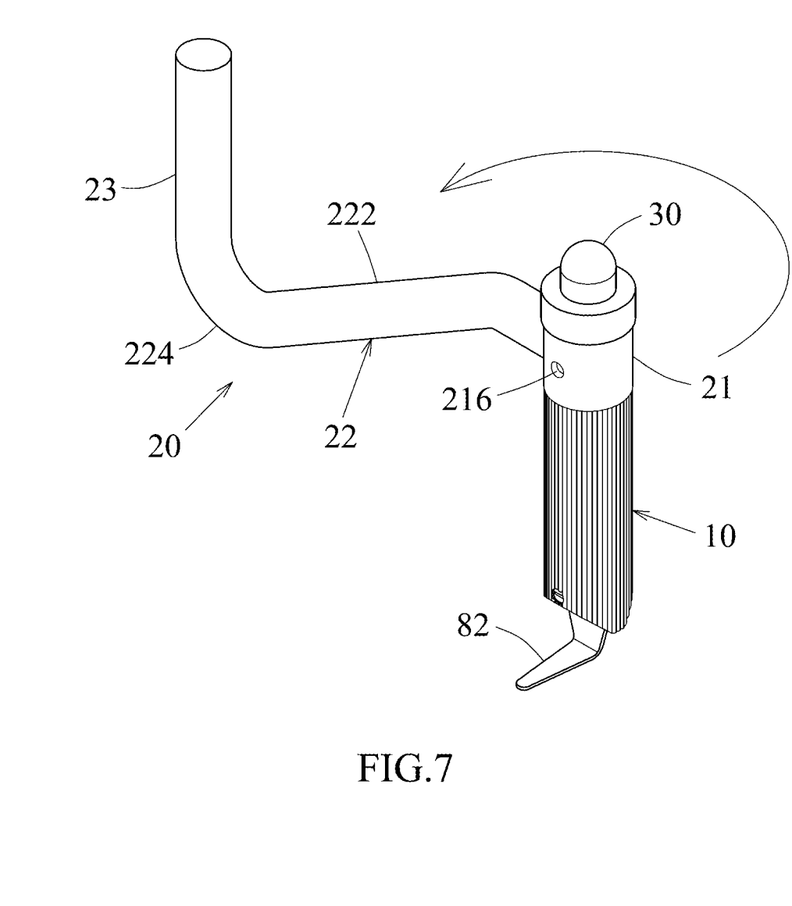
FIG. 7 is a schematic diagram of reversal motion operating state in the preferred embodiment of the present invention.
Figure 8:
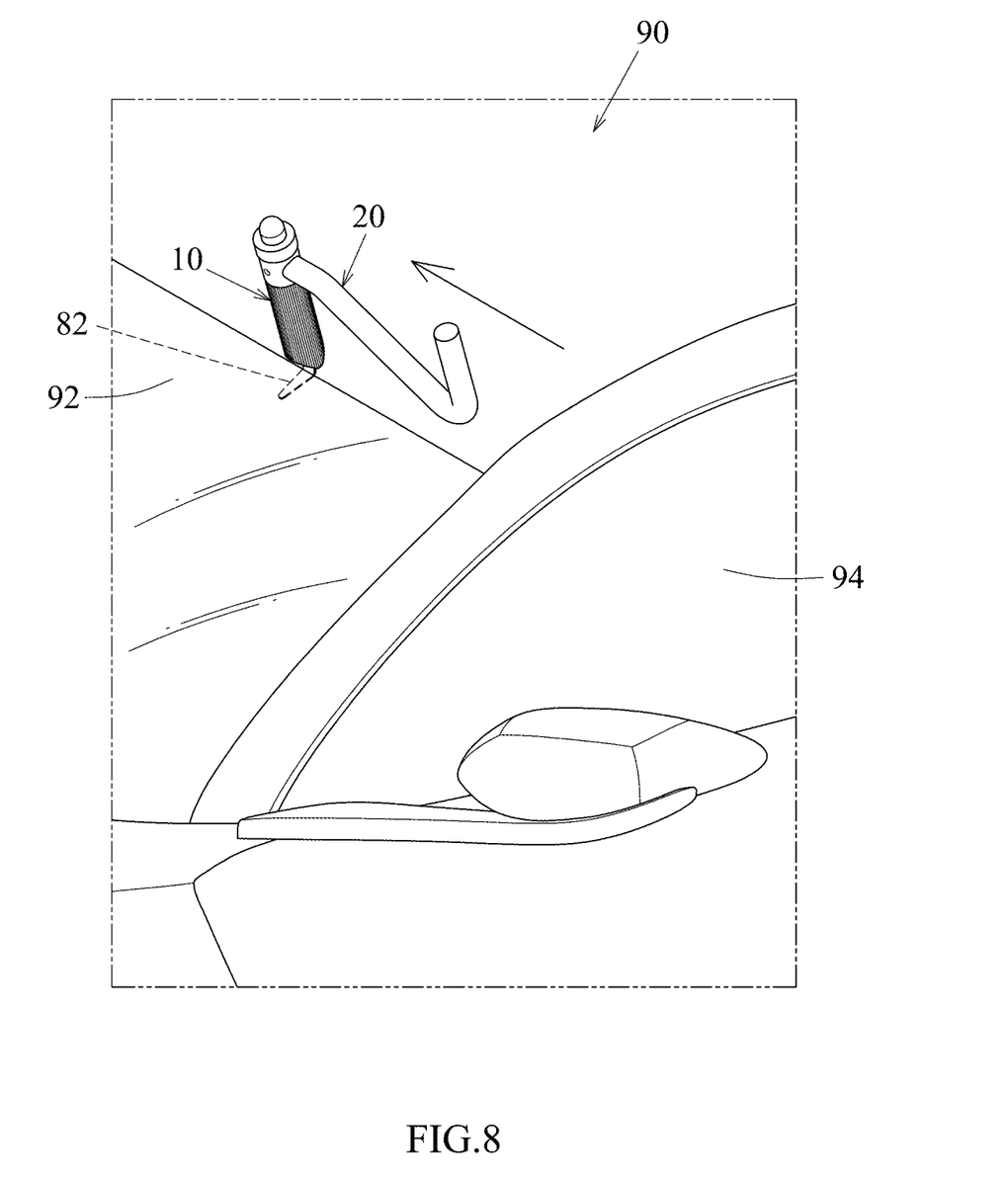
FIG. 8 is a schematic diagram of operating state of the preferred embodiment of the present invention, showing the push operating state.
Figure 9:
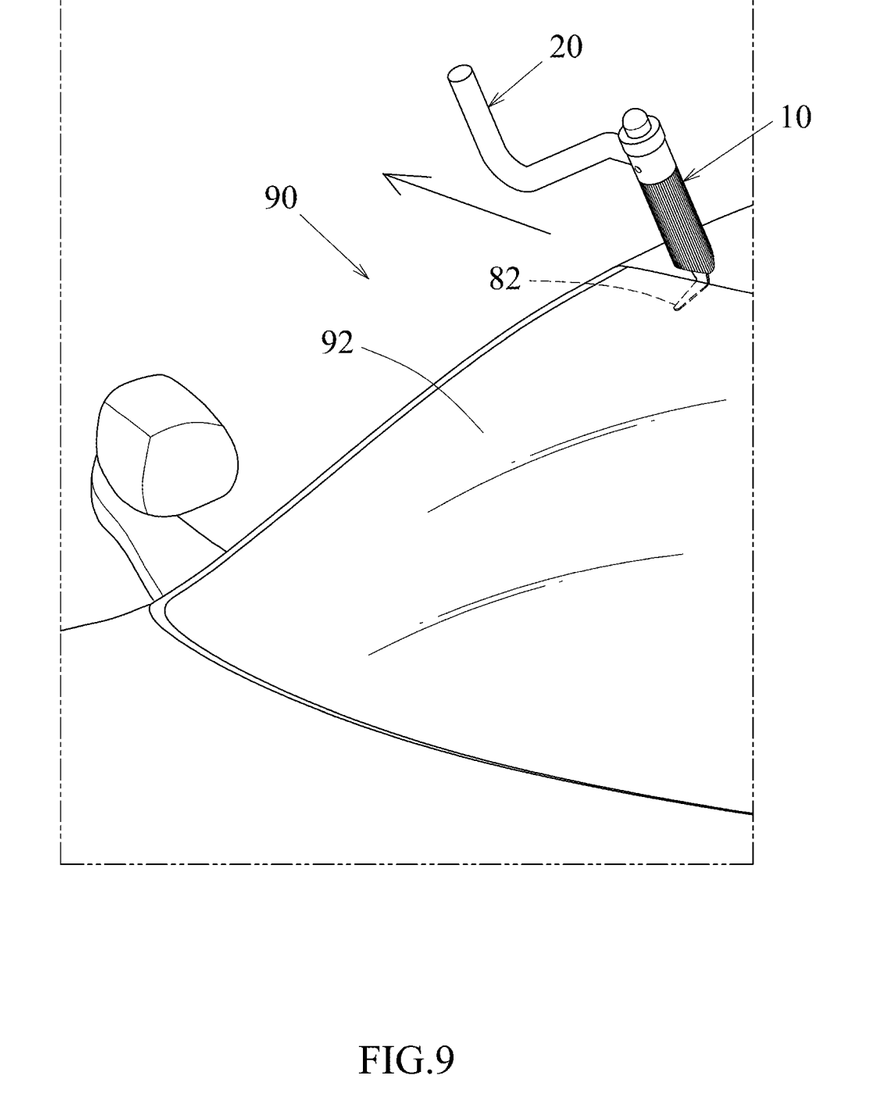
FIG. 9 is a schematic diagram of operating state of the preferred embodiment of the present invention, showing the pull operating state.

To remove the windshield 92 from the vehicle 90, the sealing element disposed on the windshield 92 facing the compartment 94 of the vehicle 90 is destroyed by the blade 82. The blade 82 is installed on the main body 10, when the blade 82 pierces the sealing element, the operator (not shown in the figure) is on one side of the vehicle 90, gripping the main body 10 with one hand, and gripping the grip rod 23 with the other hand (not shown in the figure), as shown in FIG. 8, the main body 10 is pushed towards the central part between both sides of the vehicle 90 along the edge of the windshield 92, so that the blade 82 is moved towards the opposite side of the vehicle 90. Afterwards, the detent member 30 is operated to rotate the handle 20 without cancelling the associative relation between the main body 10 and the blade 82 or extracting the blade 82 from the sealing element. When the opposite side of the grip rod 23 facing the main body 10 is positioned, the operator can move to the opposite side of the vehicle 90, as shown in FIG. 9, the main body 10 is pulled, so that the blade 82 moves towards the opposite side of the vehicle 90, the destroying operation for the sealing element is done.

One side of the pipe wall 212 facing the main body 10 forms two slots 218, the slots 218 are opposite to each other in the radial direction of the sleeve 21, both ends of the slots 218 communicate with the first hole 214 and the second hole 216 respectively, hereby, when the sleeve 21 rotates against the main body 10, the first steel ball 52 is pivotally embedded in any slot 218.

The pipe wall 212 can form one slot 218, so as to form a different implementation option. The slot 218 is optionally formed, the pipe wall 212 can be free of the slot 218. When the first hole 214 and the second hole 216 do not penetrate the pipe wall 212, in the radial direction of the sleeve 21, the depth of the slot 218 is smaller than the depth of the first hole 214 and the second hole 216.

The detent member 30 is a columnar structure. The detent member 30 is axially located in the chamber 13. The detent member 30 radially shrinks to form a first neck section 31 and a second neck section 32.

The radial distance between the first neck section 31 and the periphery of the main body 10 is smaller than the outside diameter of the first steel ball 52, when the detent member 30 is in the first position 84, the first steel ball 52 is prominently embedded in the first hole 214 or the second hole 216.

Based on the implementation option where the pipe wall 212 is free of the slot 218, the radial distance between the second neck section 32 and the periphery of the main body 10 is equal to or larger than the outside diameter of the first steel ball 52, when the detent member 30 is in the second position 86, the first steel ball 52 can depart from the first hole 214 or the second hole 216.

Based on the implementation option where the pipe wall 212 forms the slot 218, the radial distance between one side of the slot 218 far from the main body 10 in the radial direction of the sleeve 21 and the second neck section 32 is equal to or larger than the outside diameter of the first steel ball 52, hereby, when the detent member 30 is in the second position 86, the first steel ball 52 departs from the first hole 214 or the second hole 216. When the handle 20 is rotated, the first steel ball 52 can be pivotally embedded in the slot 218.

The detent member 30 forms a ring surface 33, the ring surface 33 is connected to the first neck section 31, the first steel ball 52 oppositely limits the ring surface 33, so that the detent member 30 is located in the main body 10, preventing the detent member 30 from departing from the main body 10 through the first end 11.

The main body 10 forms a mounting hole 17, the mounting hole 17 extends on one side of the slot 16. A second steel ball 54 and a second spring 44 are arranged in the mounting hole 17. The second spring 44 props the second steel ball 54, the second steel ball 54 partially protrudes from the slot 16, so that the second steel ball 54 is prominently embedded in the locating hole 822 of the blade 82 to position the blade 82. The mounting hole 17 extends on one side of the main body 10. A regulating element 56 is screwed in the mounting hole 17. The second spring 44 props the regulating element 56, the acting force of the second spring 44 applied to the second steel ball 54 can be changed by rotating the regulating element 56, so as to enhance the reliability of the second steel ball 54 in positioning the blade 82.

The connecting rod 22 has an oblique section 222 and a curved section 224. The oblique section 222 extends from top to bottom towards the grip rod 23. One end of the curved section 224 is connected to the bottom of the oblique section 222. The other end of the curved section 224 is connected to the bottom of the grip rod 23. Hereby, in the radial direction of the main body 10, the oblique section 222 is located between the main body 10 and the grip rod 23. In the preferred embodiment of pushing operation, the oblique section 222 avoids the hand which grips the grip rod 23 slipping to collide with the main body 10, the attitude of the main body 10 and the blade 82 in space remains, and the oblique section 222 and the curved section 224 support the hand which grips the grip rod 23, the reliability of gripping the grip rod 23 is enhanced. If the windshield 92 breaks to form several grains, the connecting rod 22 avoids the hand slipping down to contact the grains, the operational safety is enhanced.

The main body 10 forms an annular bearing face 18, the bearing face 18 is located between the first end 11 and the second end 12. A locating ring 60 is screwed on the main body 10, the locating ring 60 and the bearing face 18 oppositely limit the sleeve 21, so as to position the sleeve 21.

The bearing face 18 and the locating ring 60 are optionally formed, based on the implementation option where the pipe wall 212 forms the slot 218, the first steel ball 52 is pivotally embedded in the first hole 214, the second hole 216 or the slot 218, the first steel ball 52 can oppositely confine the sleeve 21, it is unnecessary to arrange the bearing face 18 and the locating ring 60.

The detent member 30 protrudes from the main body 10 through the first end 11 to form a press end 35, so that the detent member 30 can be pressed, and it is convenient to actuate the detent member 30 from the first position 84 to the second position 86.

Several ridges 19 are formed on the radial periphery of the main body 10, the ridges 19 extend in the axial direction of the main body 10 respectively, so as to enhance the reliability of gripping the main body 10.

We claim:

1. A cold knife holder comprising:
a columnar main body having a first end and a second end opposite to each other, said columnar main body having a chamber and a slot, the chamber extending from the first end into said columnar main body, the slot extending from the second end into said columnar main body, said columnar main body having an abutting surface formed therein, the chamber being located between the first end and the abutting surface, said columnar main body having a perforation on one side, the perforation communicating with the chamber, the slot adapted to receive a blade therein;
a handle having a sleeve and an elongated connecting rod and a grip rod, wherein one end of the elongated connecting rod is connected to one side of the sleeve, another end of the elongated connecting rod being connected to the grip rod, the grip rod adapted to be gripped by a user, the sleeve being pivotally sleeved to the first end of said columnar main body, the sleeve having a pipe wall, wherein one side of the pipe wall facing said columnar main body has a first hole and a second hole, the first hole and the second hole being opposite to each other on the sleeve, said handle being rotatable against the first end of said columnar main body, the first hole and the second hole communicating with the perforation;
a detent member movably arranged in the chamber, said detent member being reciprocable between a first position and a second position in said columnar main body;
a first spring positioned in the chamber, said first spring having opposite ends urging against the abutting surface and said detent member respectively, and
a first steel ball pivotally embedded in the perforation, said first steel ball urging against said detent member such that said detent member drives said first steel ball so as to be received in the first hole or the second hole so as to position said handle after the rotation.

2. The cold knife holder of claim 1, wherein one side of the pipe wall defines the slot, the slot having opposite ends communicating with the first hole and the second hole respectively.

3. The cold knife holder of claim 2, wherein the slot has a depth less than a depth of the first hole and the second hole.

4. The cold knife holder of claim 2, wherein said detent member has a first neck section and a second neck section, wherein a distance between the first neck section and a periphery of said columnar main body is less than an outer diameter of said first steel ball, the first position of said detent member has said first steel ball embedded in the first hole or the second hole, a distance between one side of the slot away from said columnar main body in a direction of the sleeve and the second neck section is equal to or greater than an outer diameter of said first steel ball such that when said detent member is in the second position said first steel ball separates from the first hole or the second hole and is received in the slot.

5. The cold knife holder of claim 2, wherein the first hole and the second hole penetrate the pipe wall respectively, an inner diameter of the first hole and the second hole being less than an outer diameter of said first steel ball.

6. The cold knife holder of claim 1, wherein the first hole and the second hole penetrate the pipe wall respectively, an inner diameter of the first hole and the second hole being less than an outer diameter of said first steel ball.

7. The cold knife holder of claim 6, wherein said detent member has a first neck section and a second neck section, wherein a distance between the first neck section and a periphery of said columnar main body is less than an outer diameter of said first steel ball, the first position of said detent member has said first steel ball embedded in the first hole or the second hole, a distance between one side of the slot away from said columnar main body in a direction of the sleeve and the second neck section is equal to or greater than an outer diameter of said first steel ball such that when said detent member is in the second position said first steel ball separates from the first hole or the second hole.

8. The cold knife holder of claim 1, wherein said columnar main body has a mounting hole, the mounting hole extending from one side of the slot, the cold knife holder further comprising:
   a second steel ball; and
   a second spring, the second steel ball and the second spring being positioned in the mounting hole, said second spring urging against said second steel ball, said second steel ball partially protruding from the slot such that said second steel ball is adapted to be embedded in a locating hole of the blade in order to position the blade.

9. The cold knife holder of claim 1, wherein the elongated connecting rod has an oblique section and a curved section, the oblique section extending toward the grip rod, the curved section having one end connected to a bottom of the oblique section, another end of the curved section being connected to a bottom of the grip rod.

10. The cold knife holder of claim 1, wherein said columnar main body has an annular bearing face, the annular bearing face being located between the first end and the second end of the columnar main body, the first end of said columnar main body having a locating ring screwed thereon, the locating ring and the annular bearing face limiting a movement of the sleeve so as to position the sleeve.

* * * * *